(12) United States Patent
Uchino et al.

(10) Patent No.: US 9,820,238 B2
(45) Date of Patent: Nov. 14, 2017

(54) USER APPARATUS AND UPLINK TRANSMISSION POWER INFORMATION TRANSMISSION METHOD

(71) Applicant: NTT DOCOMO, INC., Tokyo (JP)

(72) Inventors: Tooru Uchino, Tokyo (JP); Hideaki Takahashi, Tokyo (JP); Kazuki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/303,594

(22) PCT Filed: Apr. 14, 2015

(86) PCT No.: PCT/JP2015/061435
§ 371 (c)(1),
(2) Date: Oct. 12, 2016

(87) PCT Pub. No.: WO2015/159874
PCT Pub. Date: Oct. 22, 2015

(65) Prior Publication Data
US 2017/0034788 A1    Feb. 2, 2017

(30) Foreign Application Priority Data
Apr. 18, 2014   (JP) .................. 2014-086729

(51) Int. Cl.
*H04B 7/00* (2006.01)
*H04W 52/14* (2009.01)
(Continued)

(52) U.S. Cl.
CPC .......... *H04W 52/146* (2013.01); *H04B 7/024* (2013.01); *H04W 52/34* (2013.01);
(Continued)

(58) Field of Classification Search
CPC .................. H04W 52/146; H04W 52/365
(Continued)

(56) References Cited

U.S. PATENT DOCUMENTS

2012/0082043 A1    4/2012 Hwang et al.
2012/0127933 A1*   5/2012 Worrall ............... H04W 52/367
                                                         370/329
(Continued)

FOREIGN PATENT DOCUMENTS

JP   2013-546215 A   12/2013
JP   2014-502128 A    1/2014
WO   2012-154588 A1  11/2012

OTHER PUBLICATIONS

International Search Report issued in PCT/JP2015/061435 dated Jul. 7, 2015 (2 pages).
(Continued)

*Primary Examiner* — Tan H Trinh
(74) *Attorney, Agent, or Firm* — Osha Liang LLP

(57) ABSTRACT

A user apparatus in a mobile communication system including a first base station and a second base station that perform communication with the user apparatus by inter-base station carrier aggregation, including: a transmission trigger detection unit configured to detect a transmission trigger for transmitting uplink transmission power information in the user apparatus to the first base station or to the second base station; and an uplink transmission power information transmission unit configured to transmit the uplink transmission power information to the first base station or to the second base station based on a transmission trigger detected by the transmission trigger detection unit.

12 Claims, 11 Drawing Sheets

(51) Int. Cl.
*H04W 52/34* (2009.01)
*H04W 52/36* (2009.01)
*H04B 7/024* (2017.01)
*H04L 5/00* (2006.01)
*H04W 24/10* (2009.01)
*H04W 76/02* (2009.01)
*H04W 76/04* (2009.01)

(52) U.S. Cl.
CPC ......... *H04W 52/365* (2013.01); *H04L 5/0001* (2013.01); *H04W 24/10* (2013.01); *H04W 52/367* (2013.01); *H04W 76/025* (2013.01); *H04W 76/048* (2013.01)

(58) Field of Classification Search
USPC ........ 455/69, 522, 501, 443, 450, 420, 13.4, 455/512, 464, 552.1, 524, 525, 127.4, 455/135; 370/252, 329, 338
See application file for complete search history.

(56) References Cited

U.S. PATENT DOCUMENTS

| | | | |
|---|---|---|---|
| 2012/0178482 A1* | 7/2012 | Seo | H04W 56/00 455/501 |
| 2012/0178494 A1 | 7/2012 | Haim et al. | |
| 2013/0077514 A1* | 3/2013 | Dinan | H04L 5/0057 370/252 |
| 2014/0056278 A1 | 2/2014 | Marinier et al. | |
| 2014/0295909 A1* | 10/2014 | Ouchi | H04W 52/242 455/522 |
| 2014/0321406 A1* | 10/2014 | Marinier | H04B 7/024 370/329 |
| 2015/0018030 A1* | 1/2015 | Park | H04W 52/283 455/522 |
| 2015/0022360 A1* | 1/2015 | Chen | G06F 19/345 340/573.1 |
| 2015/0201383 A1* | 7/2015 | Papasakellariou | H04W 52/367 370/278 |
| 2015/0244429 A1* | 8/2015 | Zhang | H04B 7/024 370/329 |
| 2015/0282174 A1* | 10/2015 | Takeda | H04W 72/1268 370/280 |
| 2015/0382336 A1* | 12/2015 | Zhang | H04W 16/32 370/329 |
| 2016/0044611 A1* | 2/2016 | Dai | H04W 52/146 370/329 |
| 2016/0119884 A1* | 4/2016 | Shichino | H02J 5/005 307/104 |
| 2016/0183290 A1* | 6/2016 | Ko | H04W 52/365 370/329 |
| 2016/0192268 A1* | 6/2016 | Takeda | H04W 16/32 370/331 |
| 2016/0205681 A1* | 7/2016 | Kim | H04B 7/2656 370/329 |
| 2016/0212711 A1* | 7/2016 | Yi | H04W 52/146 |
| 2016/0316508 A1* | 10/2016 | Hong | H04W 72/042 |
| 2016/0338134 A1* | 11/2016 | Nagasaka | H04W 16/32 |
| 2017/0013565 A1* | 1/2017 | Pelletier | H04W 52/146 |
| 2017/0019864 A1* | 1/2017 | Hwang | H04W 52/365 |
| 2017/0034793 A1* | 2/2017 | Uchino | H04W 52/365 |

OTHER PUBLICATIONS

Written Opinion of the International Searching Authority issued in PCT/JP2015/061435 dated Jul. 7, 2015 (4 pages).
3GPP TR 36.842 V12.0.0; "3rd Generation Partnership Project; Technical Specification Group Radio Access Network; Study on Small Cell enhancements for E-UTRA and E-UTRAN; Higher layer aspects (Release 12)"; Dec. 2013 (71 pages).
3GPP TS 36.321 V12.1.0; "3rd Generation Partnership Project; Technical Specification Group Radio Access Network; Evolved Universal Terrestrial Radio Access (E-UTRA); Medium Access Control (MAC) protocol specification (Release 12)"; Mar. 2014 (57 pages).
Office Action issued in corresponding Japanese Application No. 2016-513787, dated Jun. 6, 2017 (5 pages).
Extended European Search Report issued in the counterpart European Patent Application No. 15779289.6, dated Mar. 14, 2017 (10 pages).
KDDI Corporation; "Discussion on PHR triggering for Dual Connectivity"; 3GPP TSG RAN WG2 Meeting #85bis, R2-141199; Valencia, Spain, Mar. 31-Apr. 4, 2014 (3 pages).
NTT DOCOMO, Inc.; "Proposed work plan for Dual Connectivity"; 3GPP TSG-RAN WG2 #85bis, R2-141729; Valencia, Spain, Mar. 31-Apr. 4, 2014 (3 pages).
NSN, et al.; "PHR for dual connectivity"; 3GPP TSG-RAN WG2 Meeting #84, R2-140139; Prague, Czech Republic, Feb. 10-14, 2014 (7 pages).

* cited by examiner

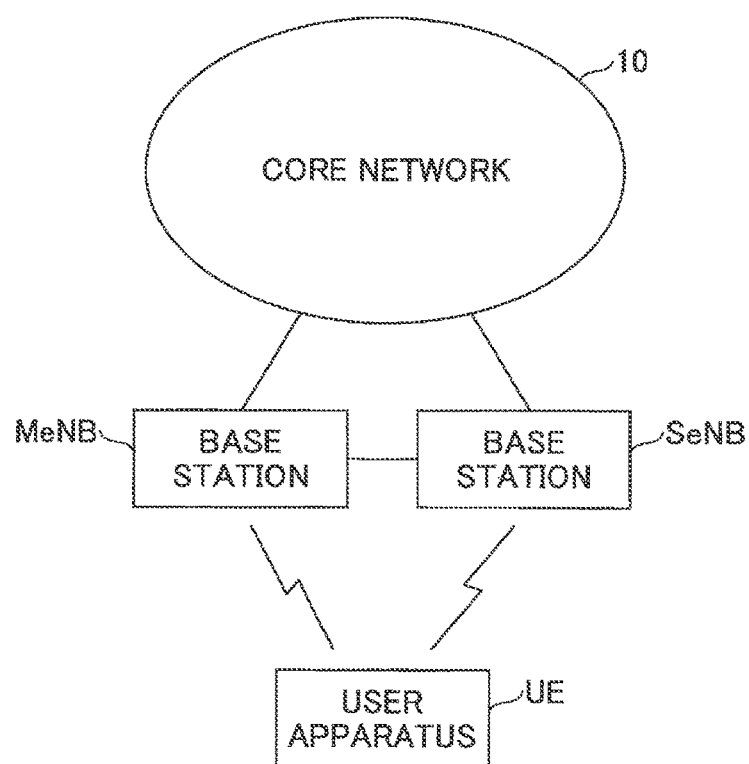

USER APPARATUS AND UPLINK TRANSMISSION POWER INFORMATION TRANSMISSION METHOD

TECHNICAL FIELD

The present invention relates to a technique in which a user apparatus transmits information on transmission power to a base station in a mobile communication system.

BACKGROUND ART

In an LTE system, carrier aggregation (CA hereinafter) for enabling communication by simultaneously using a plurality of component carriers (CC hereinafter) is introduced. As shown in FIG. 1, in CA up to Rel-11of LTE, simultaneous communication is performed by using a plurality of CCs under the same base station eNB, so that it is possible to realize high throughputs.

On the other hand, in Rel-12, this is further expanded so that Dual connectivity is proposed in which simultaneous communication is performed by using CCs under different base stations eNB to realize high throughputs (non-patent document 1). That is, in Dual connectivity, the user apparatus UE performs communication simultaneously using radio resources of two physically different base stations eNB.

Dual connectivity is also referred to as Inter eNB CA (inter-base station carrier aggregation), in which Master-eNB (MeNB) and Secondary-eNB (SeNB) are introduced. FIG. 2 shows an example of Dual connectivity. In the example of FIG. 2, an MeNB communicates with the user apparatus UE by a CC#1, and the SeNB communicates with the user apparatus UE by a CC#2 so that Dual connectivity is realized.

In Dual connectivity, (one or a plurality of) cell(s) under an MeNB is called MCG (Master Cell Group), and (one or a plurality of) cell(s) under an SeNB is called SCG (Secondary Cell Group). A cell of the SCG added first is called a PSCell (primary SCell). Although an SCell in CA is activated and deactivated by a MAC control signal in general, it is assumed that the PSCell is always activated.

RELATED ART DOCUMENT

Non Patent Document

[Non Patent Document 1] 3GPP TR 36.842 V12.0.0 (2013-12)
[Non Patent Document 2] 3GPP TS 36.321 V12.1.0 (2014-03)

SUMMARY OF THE INVENTION

Problem to be Solved by the Invention

A transmission power by which the user apparatus UE transmits data to the base station eNB needs to be a proper size. Thus, the user apparatus UE calculates an UL transmission power using a predetermined function, to perform UL transmission using the calculated UL transmission power. In the following, an example of the predetermined function is shown.

$$P_{PUSCH,c}(i) = \min \begin{cases} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{cases}$$ (equation 1)

In the equation 1, $P_{CMAX,c}(i)$ is the maximum transmission power of an i-th subframe of a serving cell c, $M_{PUSCH,c}(i)$ is the number of resource blocks, $\Delta_{TF,c}$ is a power offset derived from MCS (Modulation Coding Scheme), $PL_c$ is a pathloss, and $f_c(i)$ is an accumulated TPC command. The others are broadcasted parameters.

The user apparatus UE inputs an assigned resource amount, applying MCS and the like to the predetermined function to determine a transmission power and perform UL transmission. When the calculated transmission power exceeds the maximum transmission power, the user apparatus UE performs UL transmission by applying the maximum transmission power.

The base station eNB ascertains a transmission power of the user apparatus UE based on the above-mentioned equation 1 in order to perform power control and scheduling (resource assignment, MCS determination and the like) such that the transmission power of the user apparatus UE becomes a proper value. However, among variables in the above-mentioned equation 1, since the pathloss is unknown, the user apparatus UE transmits a PHR (power headroom report) including a PH (power headroom) to the base station eNB based on a predetermined trigger (example: when the pathloss changes), so that the base station eNB calculates a transmission power of the user apparatus UE based on the PHR.

The power headroom (PH) is a value calculated by the following equation 2, and it means a difference between the maximum transmission power and a transmission power that is currently used.

$$PH_{type1,c}(i) = P_{CMAX,c}(i) - \{10\log_{10}(M_{PUSCH,c}(i)) + P_{O\_PUSCH,c}(j) + \alpha_c(j) \cdot PL_c + \Delta_{TF,c}(i) + f_c(i)\}$$ (equation 2)

FIG. 3A and FIG. 3B are figures showing examples of PHs. FIG. 3A shows a case where the maximum transmission power is larger than the calculated transmission power, in which the PH becomes a positive value. FIG. 3B shows a case where the calculated transmission power is greater than the maximum transmission power. In this case, the actual transmission power becomes the maximum transmission power, in which the PH becomes a negative value.

In LTE, it is defined that the user apparatus UE reports a PHR for each CC to the base station eNB. For example, in the non-patent document 2, a MAC signal (Extended Power Headroom MAC Control Element) for PHR transmission is defined as shown in FIG. 4.

Also, as a trigger for transmitting a PHR, for example, in the non-patent document 2, a case of pathloss change and the like is described.

In CA up to Rel-11, a single base station eNB performs TPC control and scheduling for all SCells configured in the UE. On the other hand, in Dual Connectivity, a plurality of base stations eNB perform TPC control and scheduling. Therefore, for example, unless the base stations eNB perform assignment while confirming, with each other, that there is a room in transmission power that can be allocated, UL transmission power lacks immediately, so that there is a possibility in that sufficient throughput cannot be obtained.

However, according to current PHR triggers, there is a possibility in that each base station eNB cannot obtain sufficient transmission power information to perform scheduling for causing the user apparatus UE to perform UL transmission using proper power.

For example, it can be considered that, even when transmission power for a PSCell increases due to addition of the PSCell in the base station SeNB, the base station MeNB does not obtain a PHR so that the base station MeNB performs scheduling on the MCG without accurately ascertaining transmission power of each CC in the user apparatus UE.

The present invention is contrived in view of the above-mentioned points, and an object of the present invention is to provide a technique that enables a first base station or a second base station to properly obtain uplink transmission power information in a mobile communication system including the first base station and the second base station that perform communication with a user apparatus by inter-base station carrier aggregation.

Means for Solving the Problem

According to an embodiment of the present invention, there is provided a user apparatus in a mobile communication system including a first base station and a second base station that perform communication with the user apparatus by inter-base station carrier aggregation, including:

a transmission trigger detection unit configured to detect a transmission trigger for transmitting uplink transmission power information in the user apparatus to the first base station or to the second base station; and an uplink transmission power information transmission unit configured to transmit the uplink transmission power information to the first base station or to the second base station based on a transmission trigger detected by the transmission trigger detection unit.

According to an embodiment of the present invention, there is provided an uplink transmission power information transmission method executed by a user apparatus in a mobile communication system including a first base station and a second base station that perform communication with the user apparatus by inter-base station carrier aggregation, including:

a transmission trigger detection step of detecting a transmission trigger for transmitting uplink transmission power information in the user apparatus to the first base station or to the second base station; and an uplink transmission power information transmission step of transmitting the uplink transmission power information to the first base station or to the second base station based on a transmission trigger detected by the transmission trigger detection step.

Effect of the Present Invention

According to an embodiment of the present invention, it becomes possible that a first base station or a second base station properly obtains uplink transmission power information, in a mobile communication system including the first base station and the second base station that perform communication with a user apparatus by inter-base station carrier aggregation.

BRIEF DESCRIPTION OF THE DRAWINGS

FIG. 4 is a diagram showing an example of a signal for reporting power headroom (Extended Power Headroom MAC Control Element);
FIG. 5 is a diagram showing a configuration example of a communication system in an embodiment of the present invention.

EMBODIMENTS FOR CARRYING OUT THE INVENTION

Figure 1:
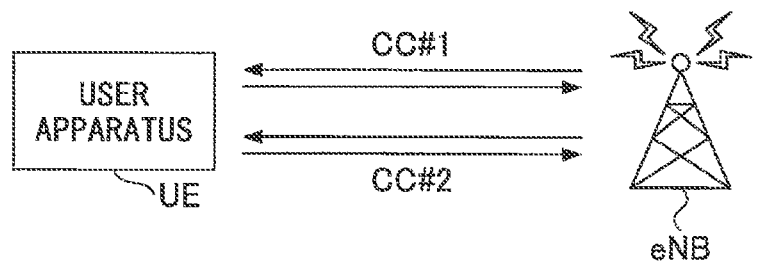
FIG. 1 is a diagram showing a CA up to Rel-11.
Figure 2:
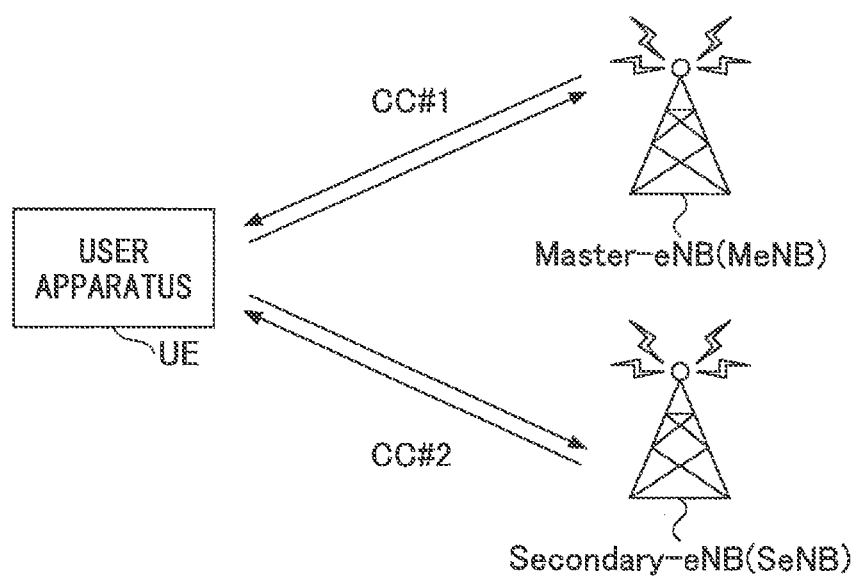
FIG. 2 is a diagram showing an example of Dual Connectivity.
Figure 3A:
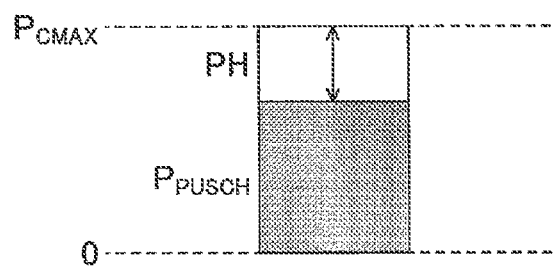
FIG. 3A is a diagram for explaining power headroom.
Figure 3B:
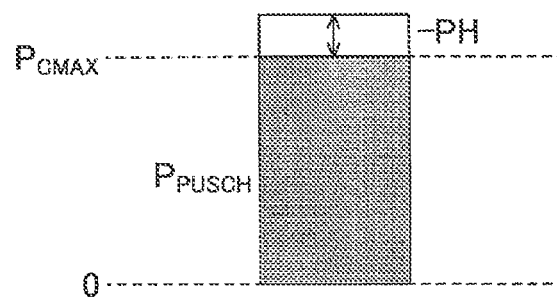
FIG. 3B is a diagram for explaining power headroom.

In the following, an embodiment of the present invention is described with reference to figures. The embodiment described below is merely an example, and the embodiment to which the present invention is applied is not limited to the embodiment below. Although it is assumed that the communication system of the present embodiment supports LTE, the present invention can be applied not only to LTE but also to other schemes. Also, in the specification and the claims, the term "LTE" is used to mean Rel-12 of 3GPP, or schemes after Rel-12 unless otherwise stated.

Also, in the following description, "cell" such as PCell, SCell and the like can be considered to be synonymous with a component carrier (CC) that forms the cell. Also, in the following, an example is shown in which a PHR is transmitted as uplink transmission power information. However, uplink transmission power information to transmit is not limited to the PHR.

Also, in the following, it is assumed that the PHR is transmitted to all CCs irrespective of MeNB or SeNB. However, it is possible to transmit a PHR for each CC under the MeNB and a PHR for each CC under the SeNB separately.

(Whole Configuration Example of the Communication System)

FIG. 5 shows a configuration example of a mobile communication system of an embodiment of the present invention. As shown in FIG. 5, the mobile communication system of the present embodiment includes a base station MeNB and a base station SeNB each connected to a core network 10, which enables Dual Connectivity between the base station MeNB/base station SeNB and the user apparatus UE. Also, communication is available between the base station MeNB and the base station SeNB by an X2 interface, for example. Therefore, for example, even when only the base station MeNB receives a PHR from the user apparatus UE, the PHR can be also used in the base station SeNB by transmitting the PHR to the base station SeNB. Also, for example, even when only the base station SeNB receives a PHR from the user apparatus UE, the PHR can be also used in the base station MeNB by transmitting the PHR to the base station MeNB.

In the following, "base station (MeNB, SeNB)" indicates that any of only base station MeNB, only base station SeNB, and both of the base station MeNB and the base station SeNB can be applied.

In the present embodiment, in a case where UL transmission from the user apparatus UE to the base station MeNB or to the base station SeNB by a new CC (Cell) occurs or already performed UL transmission stops, when the user apparatus UE detects the event (or detects execution of a predetermined process related to the event) as a trigger, the user apparatus UE performs processing of transmitting a PHR to the base station (MeNB, SeNB), and the like. When UL transmission by a CC in a CG occurs/stops, UL transmission power that the user apparatus UE can use for the CG and for another CG changes. So, the user apparatus UE notifies the base station (MeNB, SeNB) of the fact. In the following, as concrete examples, first to seventh examples are described.

FIRST EXAMPLE

First, an outline of a first example is described with reference to FIG. 6. As described before, an SCell that is configured first in an SCG (a Cell group under the base station SeNB) is called a PSCell. In the first example, the user apparatus UE transmits a PHR to the base station (MeNB, SeNB) being triggered by an event that the PSCell is configured (added) in the user apparatus UE.

Figure 6:
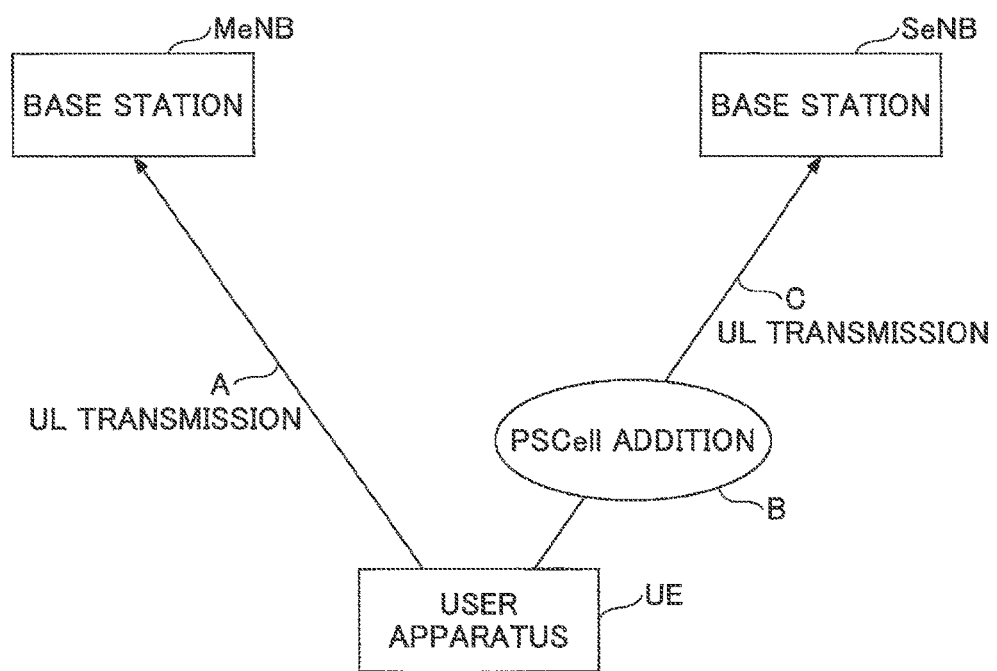
FIG. 6 is a diagram for explaining a first example of a PHR transmission trigger.

That is, for example, as indicated by "A" of FIG. 6, in a state where the user apparatus UE in which an MCG (including a PCell) is configured is performing UL transmission to the base station MeNB, it is assumed that a PSCell is configured as indicated by "B", and that UL transmission from the user apparatus UE to the base station SeNB starts as indicated by "C". In this case, for example, due to the start of the UL transmission to the base station SeNB, UL transmission power to the base station MeNB/SeNB that the user apparatus UE can use changes. By PHR transmission, the base station (MeNB, SeNB) is notified of such a situation.

By the way, in conventional CA which is not Dual connectivity, the user apparatus UE triggers PHR transmission when receiving an activation command of an SCell from the base station eNB. However, as to the PSCell, the UE autonomously activates it after PSCell addition instruction, Thus, in the conventional technique, the PHR transmission trigger was not clear. On the other hand, in the present example, this is clarified, so that PHR transmission trigger can be properly performed based on addition and the like of the PSCell. Also, when the PSCell is deleted, PHR transmission can be performed being triggered by it.

Figure 7:
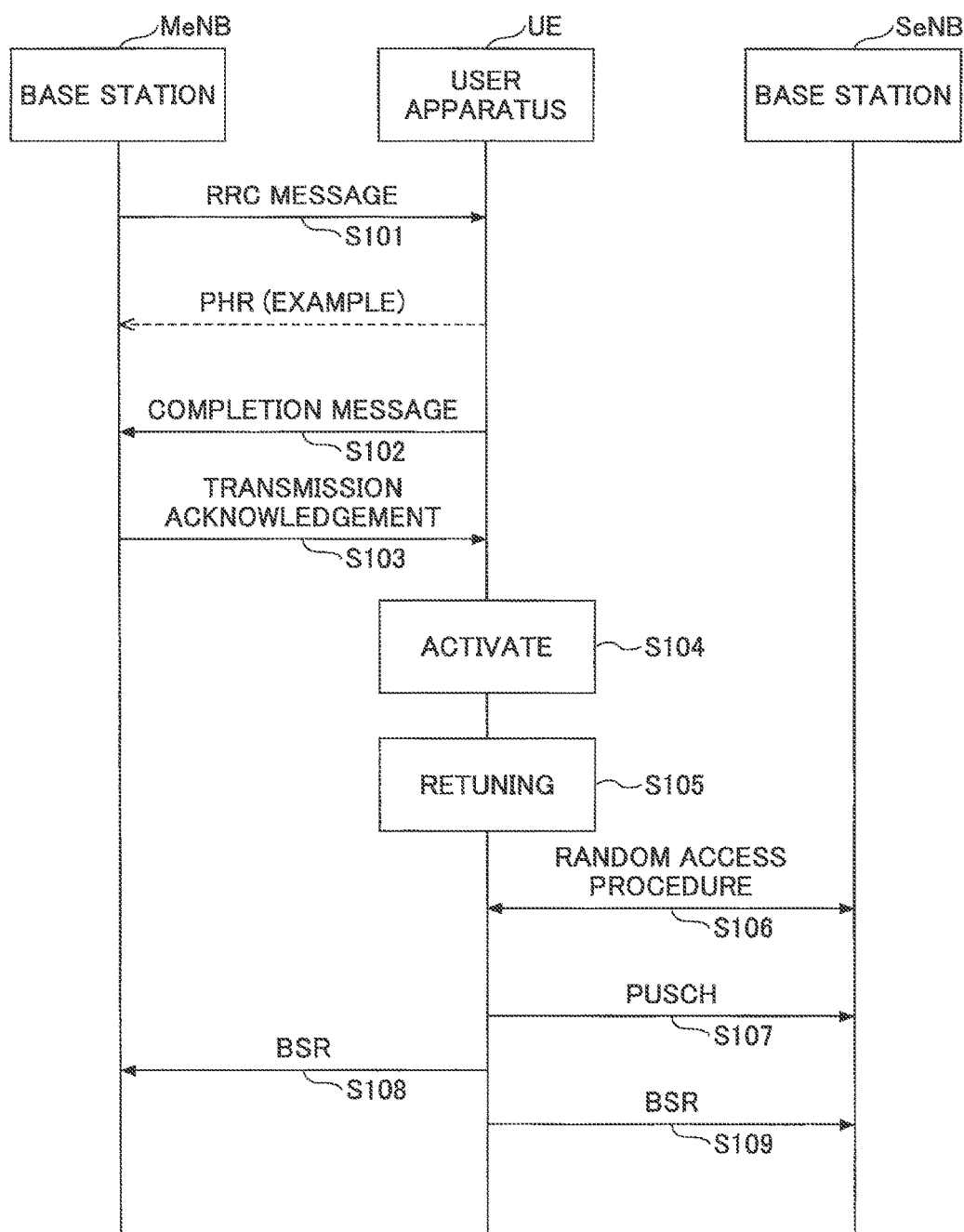
FIG. 7 is a diagram for explaining a first example of a PHR transmission trigger.

An example of more concrete PHR transmission trigger timing is described with reference to FIG. 7. FIG. 7 shows main signal transmission and reception and shows process content in the user apparatus UE when a PSCell is added. The use apparatus UE can transmit a PHR to the base station (MeNB, SeNB) based on each process shown in FIG. 7 as a trigger.

As shown in FIG. 7, for example, when the base station MeNB determines to configure a PSCell (that is, SCG) to the user apparatus UE, the base station MeNB transmits an RRC message to the user apparatus UE to instruct configuring of the PSCell. As shown by a dotted line as an example in FIG. 7, the user apparatus UE can transmit a PHR to the base station (MeNB, SeNB) when receiving an RRC message for instructing configuration of the PSCell as a trigger. The trigger here may be also an event that the user apparatus UE receives the RRC message and performs a process for the RRC message (example: ascertaining a CC to be used as the PSCell, and the like).

The user apparatus UE transmits a complete message indicating that processing for the RRC message has completed (step 102), the base station MeNB that receives it transmits a transmission acknowledgement (MAC-ACK, RLC-ACK and the like) to the user apparatus UE, and the user apparatus UE receives the transmission acknowledgement (step 103). The user apparatus UE can transmit a PHR to the base station (MeNB, SeNB) using any of the transmission in step 102 and the reception in step 103 as a trigger.

Next, the user apparatus UE activates the PSCell (step 104), and performs retuning of radio (step 105). Activation is to perform processing in the user apparatus UE such that a CC of the PSCell can be actually used for CA (DC in the present embodiment). Retuning is to perform adjustment and the like of radio frequency of each CC according to addition of the CC.

The user apparatus UE may transmit a PHR to the base station (MeNB, SeNB) at the timing of step 104 in which activation is triggered, or the user apparatus UE may transmit a PHR to the base station (MeNB, SeNB) at the stage in which retuning completes (that is, at the stage where transmission of CC of the PSCell starts).

Next, for example, the user apparatus UE performs a random access (RA) procedure (RACH transmission, RACH response reception, UL grant reception and the like)) with the base station SeNB in step 106 as a process for starting data communication with the base station SeNB. In this example, the random access procedure is performed for a TAG (Timing Advance Group) which includes the PSCell. TAG is a CC group in which propagation delay is almost the same. Also, the random access procedure may start based on an instruction from the base station SeNB.

After step 106, the user apparatus UE transmits a PUSCH (data) using a resource assigned from the base station SeNB (step 107).

The user apparatus UE may transmit a PHR to the base station (MeNB, SeNB) at the timing when the random access procedure is triggered (example: reception of instruction from the base station SeNB), or the user apparatus UE may transmit a PHR to the base station (MeNB, SeNB) at the timing of success of the random access procedure, at the timing of reception of a random access response, or at the timing of PUSCH transmission of step 107 or the like.

The user apparatus UE having UL data transmits a BSR (Buffer Status Report) to the base station (MeNB, SeNB) (step 108, 109). The user apparatus UE can transmit a PHR to the base station (MeNB, SeNB) at the timing when BSR transmission is triggered (example: occurrence of transmission data, timer expiration, periodic timing), or at the timing of transmitting the BSR. By the way, a BSR which becomes a trigger for PHR transmission may be restricted only to a Regular BSR.

In the above-mentioned PHR transmission triggers, any one trigger may be used, a plurality of the triggers may be used, or all of the triggers may be used. Also, the PHR may be transmitted only to the base station MeNB, only to the base station SeNB, or to both of the base stations MeNB and SeNB. However, when setting for transmitting a PHR to a specific base station is made from the base station (MeNB, SeNB) to the user apparatus UE, the user apparatus UE may transmit a PHR according to the setting.

Each of the PHR transmission triggers described above is an example of a predetermined process that is performed when a first cell under the base station SeNB is configured in the user apparatus UE after a primary cell under the base station MeNB is configured in the user apparatus UE.

SECOND EXAMPLE

Next, a second example is described. The second example is one in which PHR transmission is triggered based on activation of a normal SCell, and the like. The normal SCell is an SCell other than the PSCell. That is, it is an SCell of an MCG and an SCell (other than the PSCell) in an SCG.

Figure 8:
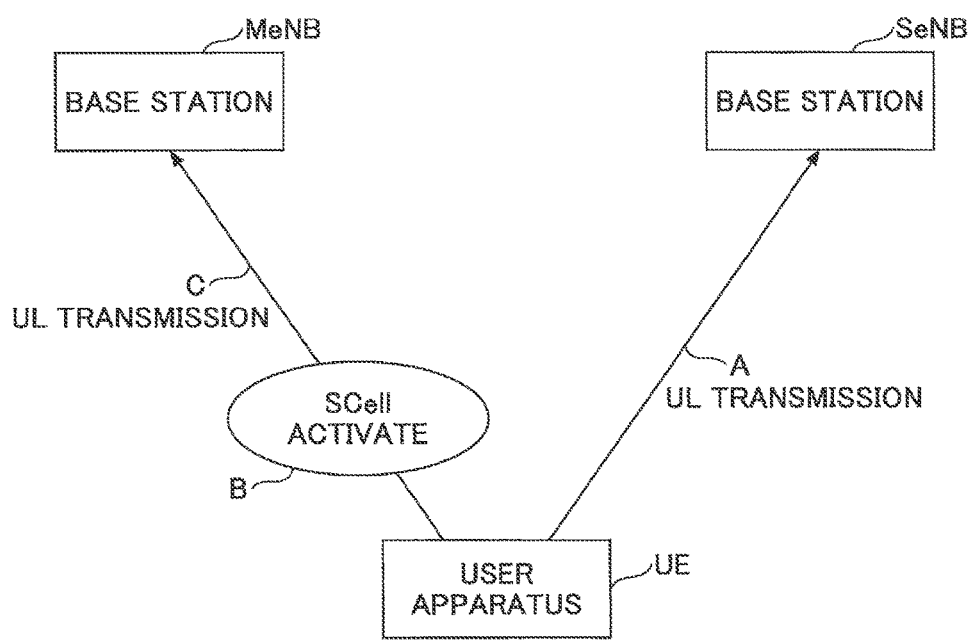
FIG. 8 is a diagram for explaining a second example of a PHR transmission trigger.

An outline of the second example is described with reference to FIG. 8. In a state where the user apparatus UE in which an SCG is configured is performing UL transmission to the base station SeNB as indicated by "A" of FIG. 8, an SCell of an MCG is activated as indicated by "B", and UL transmission from the user apparatus UE to the base station MeNB starts by a CC of the SCell as indicated by "C". In this case, for example, due to the start of the UL transmission of the new CC to the base station MeNB, UL transmission power to the base station SeNB that the user apparatus UE can use changes. By PHR transmission, the base station (MeNB, SeNB) is notified of such a situation.

Figure 9:
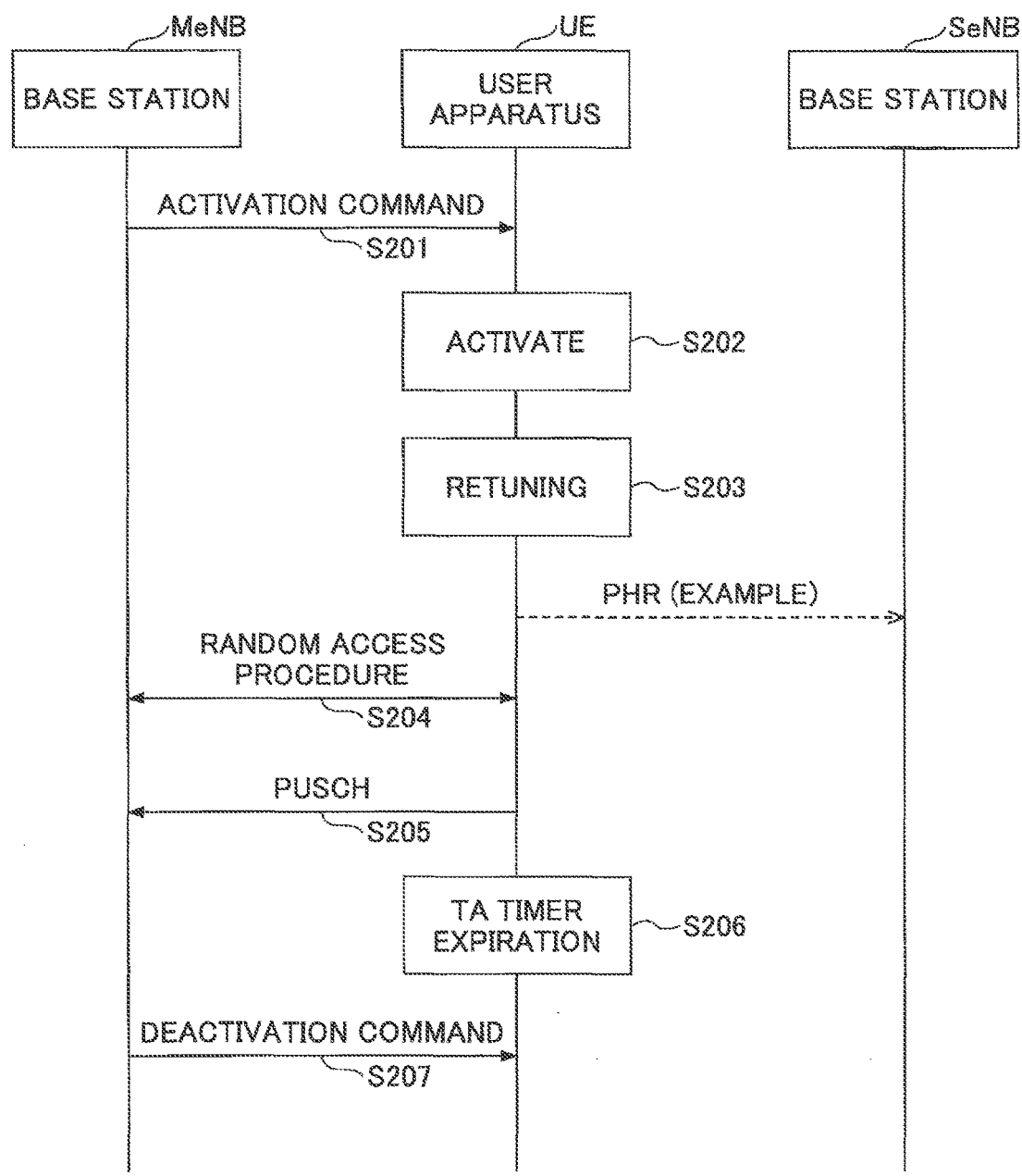
FIG. 9 is a diagram for explaining a second example of a PHR transmission trigger.

An example of more concrete PHR transmission trigger timing is described with reference to FIG. 9. FIG. 9 shows main signal transmission and reception and process content of the user apparatus UE when activating an SCell of the MCG. The user apparatus UE can transmit a PHR to the base station (MeNB, SeNB) based on each process shown in FIG. 9 as a trigger. By the way, in the case of SCell activation of an SCG, similar processes are performed.

As shown in FIG. 9, the user apparatus UE receives an activation command of an SCell from the base station MeNB (step 201), activates the SCell (step 202), and performs retuning of radio (step 203). The user apparatus UE may transmit a PHR to the base station (MeNB, SeNB) at the timing when activation of step 202 is triggered, or may transmit a PHR to the base station (MeNB, SeNB) at the stage when retuning has completed (that is, at a stage when starting transmission of a CC of the SCell). FIG. 9 describes the latter example by a dotted line.

Next, for example, the user apparatus UE performs a random access (RA) procedure with the base station MeNB in step 204 as a process for starting data communication by CA (DC) including the SCell. In this example, the random access procedure is performed for a TAG (Timing Advance Group) including the SCell.

After step 204, the user apparatus UE transmits a PUSCH (data) using a resource assigned from the base station MeNB (step 205).

The user apparatus UE may transmit a PHR to the base station (MeNB, SeNB) at the timing when the random access procedure is triggered (example: receiving an instruction from the base station MeNB), or may transmit a PHR to the base station (MeNB, SeNB) at the timing of success of the random access procedure, at the timing when receiving a random access response, or at the PUSCH transmission timing of step 205, or the like.

The user apparatus UE performs operation in which, the user apparatus UE starts a TA timer at the time point when receiving a TA (Timing Advance) command, then, when the TA timer expires without receiving a TA command again, the user apparatus UE determines that out-of-synchronization occurs in uplink, so that the user apparatus UE starts from an RA procedure in order to establish uplink synchronization when transmitting an uplink signal after that. In step 206 of FIG. 9, it is assumed that a TA timer managed for a TAG including the SCell expires. The user apparatus UE may transmit a PHR to the base station (MeNB, SeNB) at the timing when the TA timer expires.

After that, the user apparatus UE receives a command for deactivating the SCell which was activated in step 201 (step 207). The user apparatus UE may transmit a PHR to the base station (MeNB, SeNB) at the timing when the SCell is deactivated based on the command (example: at a timing when UL transmission by the SCell stops (which is an example of the predetermined process).

In the above-mentioned PHR transmission triggers, any one trigger may be used, a plurality of the triggers may be used, or all of the triggers may be used. Also, the PHR may be transmitted only to the base station MeNB, only to the base station SeNB, or to both of the base stations MeNB and SeNB. However, when setting for transmitting a PHR to a specific base station is made from the base station (MeNB, SeNB) to the user apparatus UE, the user apparatus UE may transmit a PHR according to the setting.

Each of the transmission triggers described above is an example of a predetermined process that is performed when a secondary cell under the base station MeNB or SeNB is activated or deactivated.

THIRD EXAMPLE

Next, a third example is described. In the third example, change to DRX (discontinuous reception state) is used as a PHR transmission trigger.

In DRX control, the user apparatus UE performs operation in which, the user apparatus UE starts an inactivity time (DRX Inactivity Timer) when reception (decoding) of a PDCCH is succeeded and keeps an awaking state (non-DRX state), but when the inactivity timer expires without receiving a PDCCH addressed to the user apparatus UE itself, the user apparatus UE enters a DRX state (discontinuous reception state). Also, when the user apparatus UE receives a MAC control signal (DRX command MAC CE) for instructing transition to DRX, the user apparatus UE enters a DRX state (discontinuous reception state).

Figure 10:
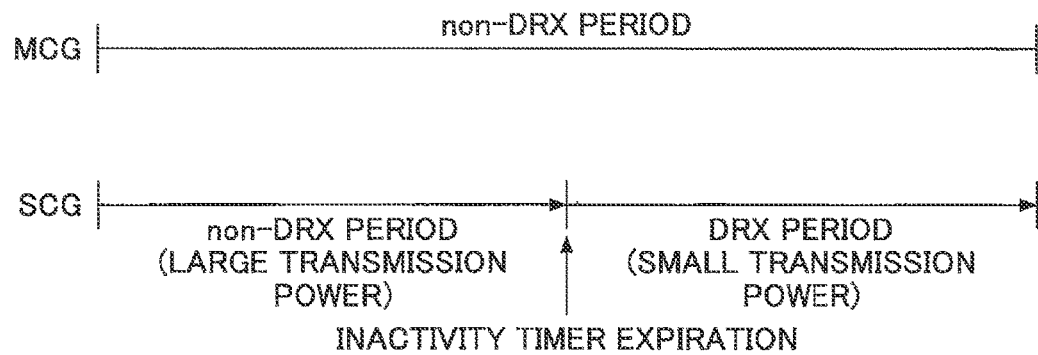
FIG. 10 is a diagram for explaining a third example of a PHR transmission trigger.

FIG. 10 shows an example of a case where transition to DRX is performed after the inactivity timer expires. As shown in FIG. 10, in the present embodiment, DRX control is performed in units of CG (for each base station).

In the example of FIG. 10, the MCG is always in non-DRX. However, in the SCG, the inactivity timer expires so that the state changes to a DRX state. In this example, the user apparatus UE transmits a PHR to the base station MeNB (base station corresponding to non-DRX) at the timing when the inactivity timer expires. That is, in this example, the user apparatus UE transmits a PHR to the base station which is in the non-DRX state.

In a case where Short DRX is configured to the user apparatus UE, when performing DRX transition, the user apparatus UE transits to a Short DRX state first, and then, when a Short DRX timer expires, the user apparatus UE transits to a Long DRX state. Transition from the Short DRX state to the Long DRX state, that is, expiration of the Short DRX timer may be used as a trigger of PHR transmission.

Figure 11:
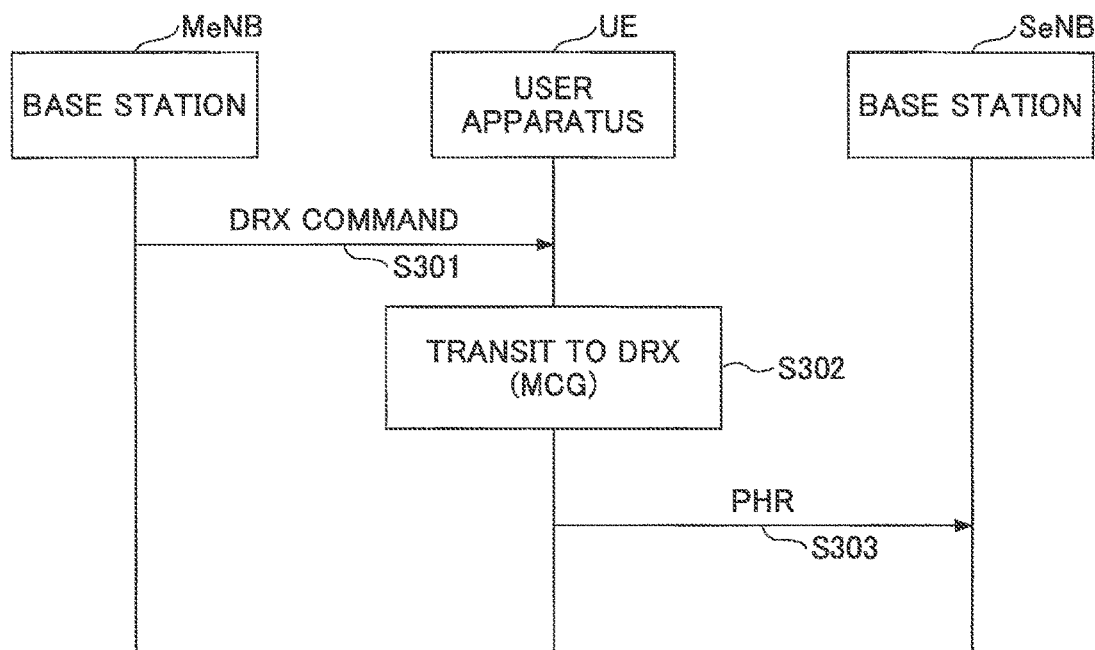
FIG. 11 is a diagram for explaining a third example of a PHR transmission trigger.

In the example shown in FIG. 11, the user apparatus UE receives, from the base station MeNB, a MAC control signal (DRX command) for changing the state of the MCG to the DRX state (step 301). According to this command, the user apparatus UE transits to a DRX state (step 302), so that the user apparatus UE transmits a PHR to the base station SeNB (non-DRX state) using the transition to the DRX state as a trigger (step 303).

FOURTH EXAMPLE

In the conventional technique, the base station eNB transmits a configuration message (phr-Config) to the user apparatus UE, so that the user apparatus UE triggers a PHR only when the configuration in the user apparatus UE is set PHR function=ON.

In the present embodiment, by a configuration message that the base station (MeNB, SeNB) transmits, configuration for the MCG (PHR function=ON or OFF) and configuration for the SCG (PHR function=ON or OFF) can be performed.

Then, for example, even when configuration for the MCG is PHR function=OFF, if configuration for the SCG is PHR function=ON, the user apparatus UE transmits a PHR to the base station SeNB corresponding to ON by a trigger described in the present embodiment. Also, even when configuration for the SCG is PHR function=OFF, if configuration for the MCG is PHR function=ON, the user apparatus UE transmits a PHR to the base station MeNB corresponding to ON by a trigger described in the present embodiment.

FIFTH EXAMPLE

Next, a fifth example is described. The fifth example is a PHR transmission trigger based on scheduling, in which PHR transmission is triggered when a predetermined period elapses after new data of DL or UL runs out for a bearer (it may be an LCH: logical channel) associated with a CG. That is, in this example, based on an assumption that, if there is no data in DL or UL, UL transmission will not occur after that, the user apparatus UE transmits a PHR to the base station (MeNB, SeNB) to cause the base station to perform proper power control or proper scheduling in such a situation.

ON/OFF of the function and the predetermined period in the fifth example may be configured individually for each bearer/LCH. Configuration can be performed, for example, by a configuration message that the base station (MeNB, SeNB) transmits to the user apparatus UE.

Figure 12:
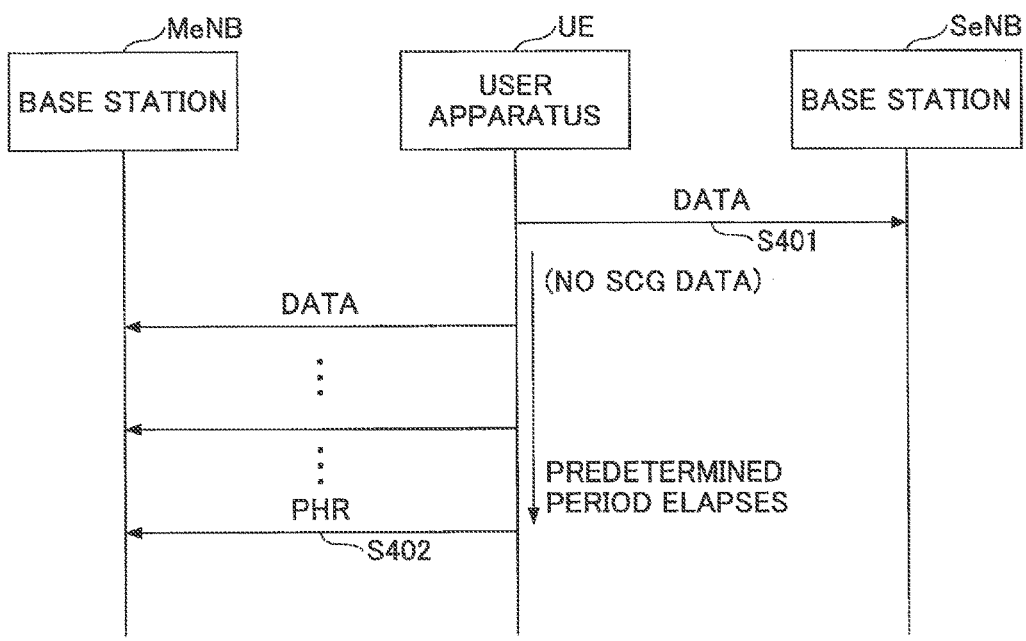
FIG. 12 is a diagram for explaining a fifth example of a PHR transmission trigger.

FIG. 12 is a sequence diagram for explaining the fifth example. In FIG. 12, data transmission is performed continuously from the user apparatus UE to the base station MeNB. On the other hand, from the user apparatus UE to the base station SeNB, it enters a state where there is no data after the last data of step 401. In this example, it is assumed that a timer (provided for each of the MCG and the SCG) corresponding to the predetermined period is set in the user apparatus UE.

The user apparatus UE starts a timer for the SCG at the time point when uplink data to the base station SeNB runs out (at the time point when the buffer remaining amount becomes 0). As shown in FIG. 12, the state where there is no data continues while the timer is running, so that the timer expires. The user apparatus UE transmits a PHR to the base station (MeNB, SeNB) at the time of elapse of the predetermined period (at expiration of the timer) as a trigger (step 402). FIG. 12 shows an example where the PHR is transmitted to the base station MeNB.

In the above-mentioned example, the case where there is no new transmission data is used as a trigger. Alternatively, PHR transmission may be triggered when a PDCCH indicating new DL data reception or new UL data transmission is not received for a predetermined period. Also, PHR transmission may be triggered when a PDCCH instructing Aperiodic SRS/CQI is not received for a predetermined period, and also, PHR transmission may be triggered when TPC-PDCCH, PDCCH order or the like is not received for a predetermined period.

SIXTH EXAMPLE

Next, a sixth example is described. In the sixth example, when the user apparatus UE detects change of radio quality, the user apparatus UE reports a PHR to a base station for which the change is not detected. However, a PHR may be reported also to a base station for which the change has been detected. The radio quality to measure is, for example, RSRP, RSRQ, CQI or the like based on a signal that the user apparatus UE receives, and the monitoring target of the quality may be for each CC, or may be for each CG. The case where the change of radio quality is detected is, for example, a case where radio quality becomes worse than a predetermined threshold, or a case where radio quality becomes better than a predetermined threshold, or the like.

Also, the user apparatus UE may transmit a PHR to the base station MeNB when the user apparatus UE detects an RLF (Radio Link Failure) for the SCG as a trigger. Here, as examples of the RLF, there are RA problem (random access failure), RLC retransmission excess, L1 failure (physical layer failure) and the like. But, it is not limited to these.

Figure 13:
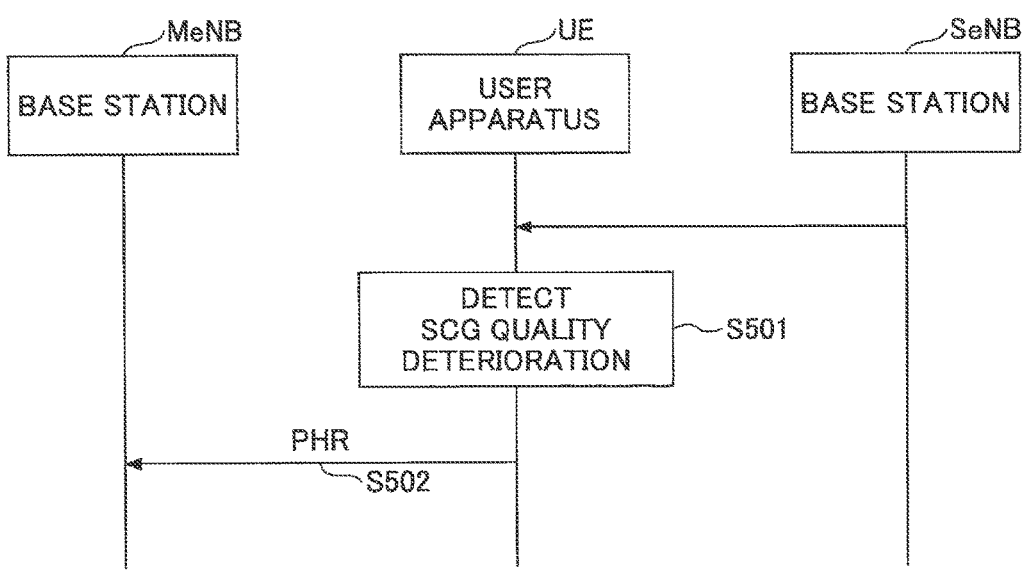
FIG. 13 is a diagram for explaining a sixth example of a PHR transmission trigger.

FIG. 13 is a sequence diagram for explaining the sixth example. In the example shown in FIG. 13, the user apparatus UE detects that quality of the SCG becomes higher (or lower) than a predetermined threshold based on a signal received from the base station SeNB (step 501). Being triggered by this detection, the user apparatus UE transmits a PHR to the base station MeNB (step 502). By the way, in FIG. 13, although the case where quality of the SCG changes is taken as an example, a PHR may be transmitted to the base station SeNB by detecting quality change of the MCG.

SEVENTH EXAMPLE

Figure 14:
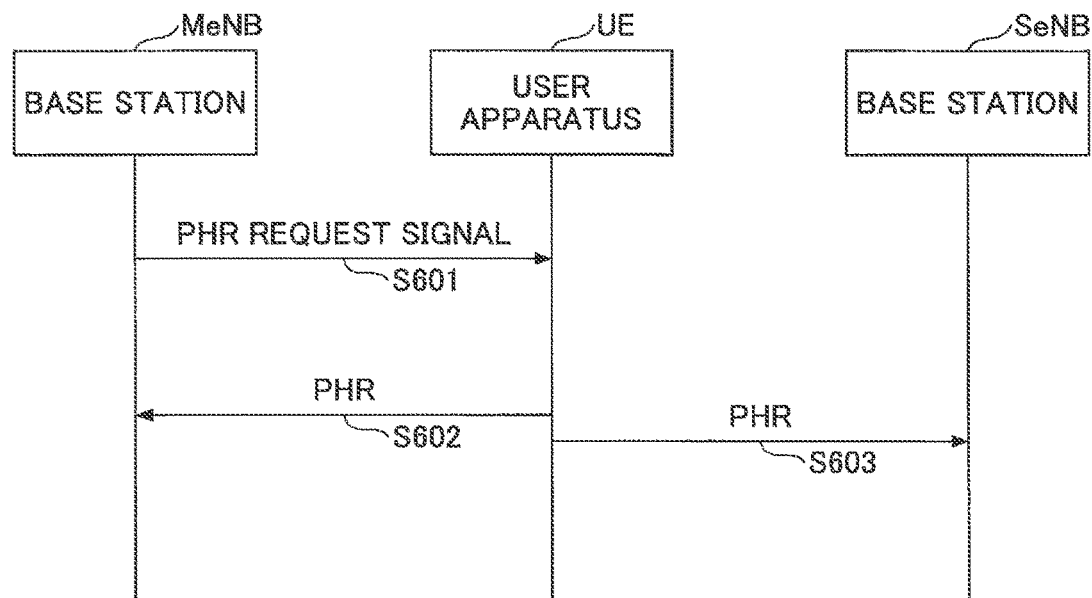
FIG. 14 is a diagram for explaining a seventh example of a PHR transmission trigger.

Next, a seventh example is described. In the seventh example, the user apparatus UE triggers PHR transmission in accordance with a request from the base station (MeNB, SeNB). FIG. 14 is a sequence diagram for explaining the seventh example. In the example of FIG. 14, the user apparatus UE receives a PHR request signal (step 601), and transmits a PHR being triggered by the reception of the PHR request signal (steps 602, 603).

As the PHR request signal, a newly defined RRC signal, MAC signal, PHY signal or the like can be used. Also, a TA command may be used as a PHR request signal.

First to seventh examples have been described so far. A plurality of any ones of the examples, or all of the examples may be combined and used.

MODIFIED EXAMPLE

In the example described so far, PHR transmission triggers in Dual Connectivity have been described. However, as described below, the PHR transmission triggers described so far can be also applied to CA which is not Dual Connectivity.

In the conventional CA, a PUCCH is transmitted only in a PCell. However, it is considered to transmit a PUCCH also in an SCell in Rel-12. In this case, a scheduling request and the like can be transmitted from each of the PCell and the SCell, so that control similar to that for Dual connectivity is applied to CA.

Figure 15:
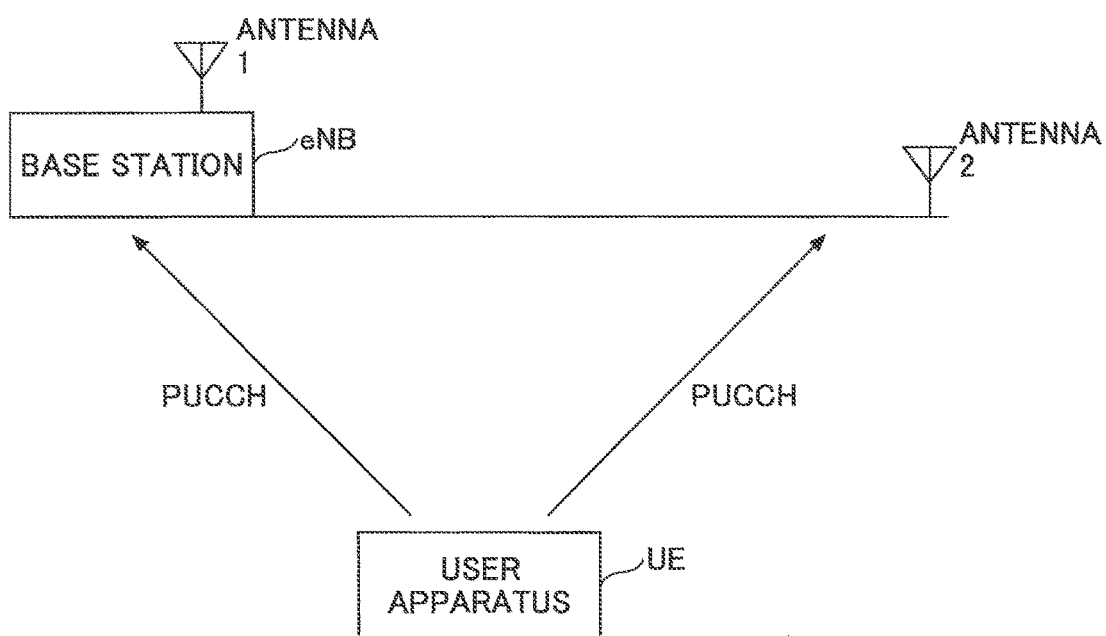
FIG. 15 is a diagram for explaining a modified example.

For example, in the configuration of CA shown in FIG. 15, an antenna 2 (this may be called a remote base station) is remotely connected to a base station eNB having an antenna 1, so that a PCell is formed by the antenna 1 and an SCell is formed by the antenna 2. Here, as described above, by transmitting a PUCCH from each of the PCell and the SCell, the base station eNB can perform control similar to that for Dual connectivity in which the base station eNB corresponds to an MeNB and the antenna 2 (remote base station) corresponds to an SeNB. Also, in such a communication system, PHR transmission triggers described so far can be applied. The communication system like this may be also referred to as a mobile communication system that performs inter-base station carrier aggregation.

(Apparatus Configuration, Operation Flow)

Figure 16:
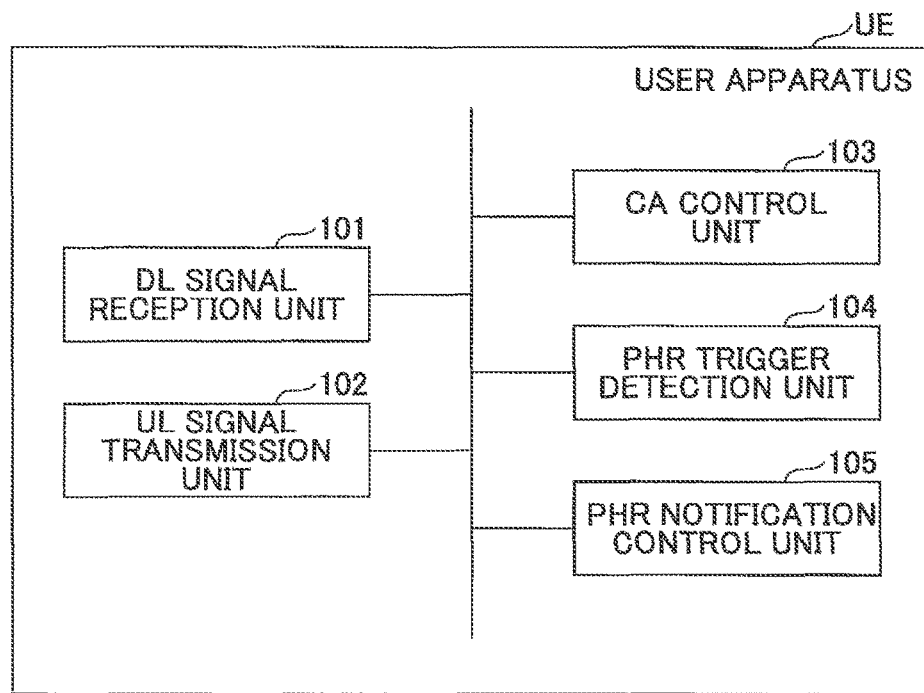
FIG. 16 is a functional block diagram of a user apparatus UE.

FIG. 16 shows a configuration example of the user apparatus UE that executes PHR transmission control described so far. FIG. 16 only shows functional units especially related to the embodiment of the present invention in the user apparatus UE, and the user apparatus UE also includes at least functions, not shown in the figure, for performing operation complying with LTE.

As shown in FIG. 16, the user apparatus UE of the present embodiment includes a DL signal reception unit 101, an UL signal transmission unit 102, a CA control unit 103, a PHR trigger detection unit 104, and a PHR notification control unit 105.

The DL signal reception unit 101 receives a radio signal from the base station (MeNB, SeNB), and extracts information from the radio signal. The UL signal transmission unit 102 generates a radio signal from transmission information to transmit the radio signal to the base station (MeNB, SeNB). The CA control unit 103 performs, for each cell (CC) that forms CA (DC), management, addition, deletion, activation, deactivation, radio tuning control and the like.

The PHR trigger detection unit 104 detects a trigger of PHR transmission by a method described so far, and when a trigger is detected, the PHR trigger detection unit 104 instructs the PHR notification control unit 105 to transmit a PHR. The PHR notification control unit 105 checks PHR configuration information stored in storage means in the user apparatus UE, generates PH information for each CC, and transmits the PH information as a PHR from the UL signal transmission unit 102. A control is also performed, in which, as a result of checking the PHR configuration information, for example, when the PHR function is ON only for the MCG, the PHR notification control unit 105 transmits a PHR only to the base station MeNB.

Figure 17:
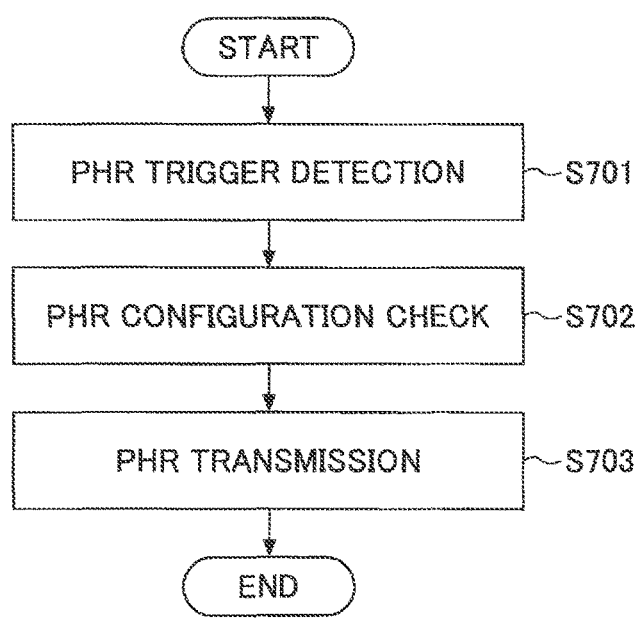
FIG. 17 is a flowchart showing an operation example of the user apparatus UE.

FIG. 17 shows a flowchart of operation of the user apparatus UE. When the user apparatus UE detects a PHR transmission trigger by a method described so far (step 701), the user apparatus UE checks PHR configuration (step 702), and performs transmission of a PHR according to content of the PHR configuration (step 703).

As described above, in the present embodiment, there is provided a user apparatus in a mobile communication system including a first base station and a second base station that perform communication with the user apparatus by inter-base station carrier aggregation, comprising:

a transmission trigger detection unit configured to detect a transmission trigger for transmitting uplink transmission power information in the user apparatus to the first base station or to the second base station; and an uplink transmission power information transmission unit configured to transmit the uplink transmission power information to the first base station or to the second base station based on a transmission trigger detected by the transmission trigger detection unit.

The transmission trigger detection unit can detect, as the transmission trigger, a predetermined process that is performed when a first cell under the second base station is configured in the user apparatus after a primary cell under the first base station is configured in the user apparatus. By adopting such a configuration, it becomes possible to transmit a PHR to the first base station or to the second base station when a PSCell is configured, so that it becomes possible to perform proper transmission power control and proper scheduling in Dual connectivity.

Also, the transmission trigger detection unit detects, as the trigger, a predetermined process that is performed when a secondary cell under the first or the second base station is activated or deactivated. By adopting such a configuration, it becomes possible to transmit a PHR to the first base station or to the second base station when a normal SCell is used or stopped, so that it becomes possible to perform proper transmission power control and proper scheduling in Dual connectivity.

Also, when the transmission trigger detection unit detects, as the transmission trigger, that communication with the first base station changes to a discontinuous reception state, the uplink transmission power information transmission unit may transmit the uplink transmission power information to the second base station, and when the transmission trigger detection unit detects, as the transmission trigger, that communication with the second base station changes to a discontinuous reception state, the uplink transmission power information transmission unit may transmit the uplink transmission power information to the first base station. By providing such a configuration, it becomes possible to transmit a PHR to the first base station or to the second base station when DRX control is performed in Dual connectivity, so that it becomes possible to perform proper transmission power control and proper scheduling.

Also, the uplink transmission power information transmission unit may check configuration content of uplink transmission power information transmission in the user apparatus, and determine a base station which becomes a destination to which the uplink transmission power information is transmitted in accordance with the configuration content. According to such a configuration, even though PHR function is OFF in one CG, if another CG is ON, a PHR can be transmitted to the base station corresponding to ON, so that it becomes possible to perform proper transmission power control and proper scheduling in Dual connectivity.

Also, the transmission trigger detection unit can detect, as the transmission trigger, that a predetermined period elapses after data of communication with the first base station runs out, or that a predetermined period elapses after data of communication with the second base station runs out. By this configuration, it can be avoided to set excessive transmission power even when there is no data.

When the transmission trigger detection unit detects, as the transmission trigger, that radio quality between the user apparatus and the first base station changes, the uplink transmission power information transmission unit may transmit the uplink transmission power information to the second base station, and when the transmission trigger detection unit detects, as the transmission trigger, that radio quality between the user apparatus and the second base station changes, the uplink transmission power information transmission unit may transmit the uplink transmission power information to the first base station. According to this configuration, in Dual connectivity, it becomes possible that one base station performs power control and scheduling in consideration of radio quality of another base station.

Also, the transmission trigger detection unit may detect, as the transmission trigger, receiving an uplink transmission power information request from the first or the second base station. According to this configuration, a PHR can be transmitted based on a trigger from the base station, so that it becomes possible that the base station performs flexible control.

The uplink transmission power information is a power headroom for each component carrier that the user apparatus uses, for example. By transmitting a power headroom from the user apparatus, the base station can calculate transmission power in the user apparatus.

Also, according to an embodiment as described above, each base station can dynamically detect when large transmission power becomes available or unavailable for the base station, so that it becomes possible to suppress deterioration of throughput due to UL transmission power fixing (meaning that maximum power continues).

The base station described in the present embodiment may include a CPU and a memory and may be realized by executing a program by the CPU (processor), or may be realized by hardware such as hardware circuits including logics of processing described in the present embodiment, or may be configured by coexistence of a program and hardware.

The user apparatus described in the present embodiment may include a CPU and a memory and may be realized by executing a program by the CPU (processor), or may be realized by hardware such as hardware circuits including logics of processing described in the present embodiment, or may be configured by coexistence of a program and hardware.

In the above, each embodiment of the present invention has been explained. However, the disclosed invention is not limited to the embodiment. Those skilled in the art will conceive of various modified examples, corrected examples, alternative examples, substituted examples, and the like. While specific numerical value examples are used to facilitate understanding of the present invention, such numerical values are merely examples, and any appropriate value may be used unless specified otherwise. Classification into each item in the description is not essential in the present invention, and features described in two or more items may be combined and used as necessary. Subject matter described in an item may be applied to subject matter described in another item (provided that they do not contradict).

It is not always true that the boundaries of the functional units or the processing units in the functional block diagram correspond to boundaries of physical components. The operations by the plural functional units may be physically performed by a single component. Alternatively, the operations by the single functional unit may be physically performed by plural components.

For convenience of explanation, the user apparatus has been explained by using functional block diagrams. However, such an apparatus may be implemented in hardware, software, or a combination thereof.

The software executed by a processor provided in the user apparatus may be stored in any proper storage medium such as a Random Access Memory (RAM), a flash memory, a Read Only Memory (ROM), an EPROM, an EEPROM, a register, a hard disk (HDD), a removable disk, a CD-ROM, a database, a server and the like.

The present invention is not limited to the above-mentioned embodiment and is intended to include various variations, modifications, alterations, substitutions and so on without departing from the spirit of the present invention.

The present international patent application claims priority based on Japanese patent application No. 2014-086729, filed in the JPO on Apr. 18, 2014, and the entire contents of the Japanese patent application No. 2014-086729 are incorporated herein by reference.

DESCRIPTION OF REFERENCE SIGNS

MeNB, SeNB base station
UE user apparatus
101 DL signal reception unit
102 UL signal transmission unit
103 CA control unit
104 PHR trigger detection unit
105 PHR notification control unit

The invention claimed is:

1. A user apparatus in a mobile communication system including a first base station and a second base station that perform communication with the user apparatus by inter-base station carrier aggregation, comprising:
   a transmission trigger detection unit configured to detect a transmission trigger for transmitting uplink transmission power information in the user apparatus to the first base station or to the second base station; and
   an uplink transmission power information transmission unit configured to transmit the uplink transmission power information to the first base station or to the second base station based on a transmission trigger detected by the transmission trigger detection unit,
   wherein the transmission trigger detection unit detects, as the transmission trigger, that a first cell under the second base station is added in the user apparatus after a primary cell under the first base station is configured in the user apparatus.

2. The user apparatus as claimed in claim 1, wherein the transmission trigger detection unit detects, as the transmission trigger, that a secondary cell under the first or the second base station is activated.

3. The user apparatus as claimed in claim 2, wherein, when the transmission trigger detection unit detects, as the transmission trigger, that communication with the first base station changes to a discontinuous reception state, the uplink transmission power information transmission unit transmits the uplink transmission power information to the second base station, and
   wherein, when the transmission trigger detection unit detects, as the transmission trigger, that communication with the second base station changes to a discontinuous reception state, the uplink transmission power information transmission unit transmits the uplink transmission power information to the first base station.

4. The user apparatus as claimed in claim 2, wherein the uplink transmission power information transmission unit checks configuration content of uplink transmission power information transmission in the user apparatus, and transmits the uplink transmission power information to the first base station or to the second base station in accordance with the configuration content.

5. The user apparatus as claimed in claim 2, wherein the transmission trigger detection unit detects, as the transmission trigger, that a predetermined period elapses after data of communication with the first base station runs out, or that a predetermined period elapses after data of communication with the second base station runs out.

6. The user apparatus as claimed in claim 1, wherein, when the transmission trigger detection unit detects, as the transmission trigger, that communication with the first base station changes to a discontinuous reception state, the uplink transmission power information transmission unit transmits the uplink transmission power information to the second base station, and wherein, when the transmission trigger detection unit detects, as the transmission trigger, that communication with the second base station changes to a discontinuous reception state, the uplink transmission power information transmission unit transmits the uplink transmission power information to the first base station.

7. The user apparatus as claimed in claim 1, wherein the uplink transmission power information transmission unit checks configuration content of uplink transmission power information transmission in the user apparatus, and transmits the uplink transmission power information to the first base station or to the second base station in accordance with the configuration content.

8. The user apparatus as claimed in claim 1, wherein the transmission trigger detection unit detects, as the transmission trigger, that a predetermined period elapses after data of communication with the first base station runs out, or that a predetermined period elapses after data of communication with the second base station runs out.

9. The user apparatus as claimed in claim 1, wherein, when the transmission trigger detection unit detects, as the transmission trigger, that radio quality between the user apparatus and the first base station changes, the uplink transmission power information transmission unit transmits the uplink transmission power information to the second base station, and wherein, when the transmission trigger detection unit detects, as the transmission trigger, that radio quality between the user apparatus and the second base station changes, the uplink transmission power information transmission unit transmits the uplink transmission power information to the first base station.

10. The user apparatus as claimed in claim 1, wherein the transmission trigger detection unit detects, as the transmission trigger, receiving an uplink transmission power information request from the first or the second base station.

11. The user apparatus as claimed in claim 1, wherein the uplink transmission power information is a power headroom for each component carrier that the user apparatus uses.

12. An uplink transmission power information transmission method executed by a user apparatus in a mobile communication system including a first base station and a second base station that perform communication with the user apparatus by inter-base station carrier aggregation, comprising:

a transmission trigger detection step of detecting a transmission trigger for transmitting uplink transmission power information in the user apparatus to the first base station or to the second base station; and an uplink transmission power information transmission step of transmitting the uplink transmission power information to the first base station or to the second base station based on a transmission trigger detected by the transmission trigger detection step, wherein the transmission trigger detection step, further comprises detecting, as the transmission trigger, that a first cell under the second base station is added in the user apparatus after a primary cell under the first base station is configured in the user apparatus.

* * * * *